April 11, 1967  B. D. BUNKER  3,313,998
SWITCHING-REGULATOR POWER SUPPLY HAVING ENERGY RETURN CIRCUIT
Filed Feb. 17, 1964
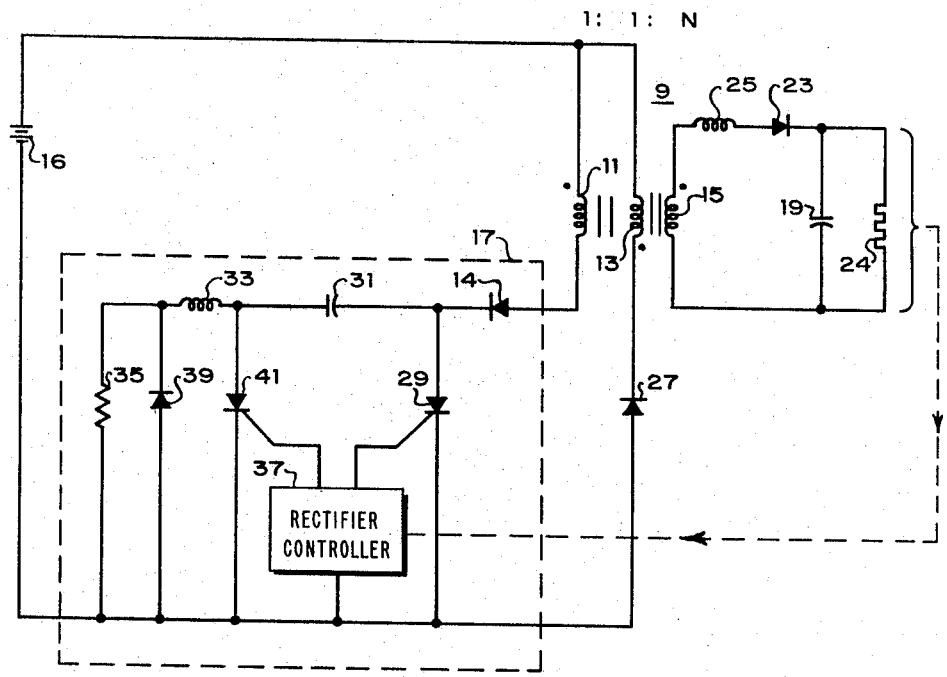
INVENTOR
BRADLEY D. BUNKER
BY  A. C. Smith
AGENT

United States Patent Office 3,313,998
Patented Apr. 11, 1967

3,313,998
SWITCHING-REGULATOR POWER SUPPLY HAVING ENERGY RETURN CIRCUIT
Bradley D. Bunker, Millington, N.J., assignor to Hewlett-Packard Company, Palo Alto, Calif., a corporation of California
Filed Feb. 17, 1964, Ser. No. 345,428
1 Claim. (Cl. 321—44)

This invention relates to a switching-type power supply which operates on a D.C. input voltage to produce a variable D.C. output voltage with high conversion efficiency.

It is an object of the present invention to provide a switching type power supply which operates with high conversion efficiency and negligible transient signals at the output as the load is varied.

It is another object of the present invention to provide a power supply circuit which can produce very high ratios of output to input voltage.

In accordance with the illustrated embodiment of the present invention input voltage is applied to the primary winding of a transformer through a controlled switch. A rectifier connected in series with an inductance and one secondary winding supplies an amount of charge to a capacitor which is related to the conduction time of the switch in the primary circuit. Another secondary winding is clamped to the input voltage during the non-conductive time of the switch in the primary circuit.

Other and incidental objects of the present invention will be apparent from a reading of this specification and an inspection of the accompanying drawing which shows a schematic diagram of the power supply of the present invention.

Referring now to the drawing, transformer 9 including primary winding 11 and secondary windings 13 and 15 is connected in the circuit with the dot polarity markings as shown. Primary winding 11 is connected to a source of voltage 16 through switch 17 which has controllable conduction time. The secondary winding 15 supplies charge to the capacitor 19 and load 24 through diode 23 and inductor 25. The other secondary winding 13 is clamped to the source 16 through diode 27.

The circuit operates in the following manner: Switch 17 closes and connects the source of voltage 16 across primary winding 11. The voltage which appears across secondary winding 15 is related to the voltage of source 16 by the turns ratio of windings 11 and 15. Current supplied the load 24 and capacitor 19 through rectifying diode 23 builds up with a time constant determined by inductor 25, the input voltage, and the output voltage. After a selected time switch 17 is opened, thereby causing a reversal of polarity of the voltages across the windings 11, 13 and 15 and across inductor 25. Current stops flowing in winding 11 and diode 27 becomes conductive. This clamps the voltages across the windings 11 and 15 to voltages which are related to the voltage of source 16 by the turns ratios of these windings and winding 13. Energy stored in inductor 25 is thus distributed between capacitor 19 and the source 16. The distribution of this energy is a function of the input voltage, turns ratio, and the output voltage. At zero output voltage no energy is delivered to the capacitor 19, all the energy being returned to the source 16. Thus for a given output voltage only a finite charge is delivered to capacitor 19. The circuit operated in this manner thus produces only negligible transient signals at the output as the load is varied.

In one embodiment switch 17 includes a silicon-controlled rectifier 29 which conducts the primary current of winding 11 during the on-time of the switch. A circuit including capacitor 31 and controlled rectifier 41 reverse biases the controlled rectifier 29 until it recovers to the non-conductive state. Initially, capacitor 31 charges to the voltages of source 16 through winding 11, diode 14, inductor 33 and resistor 35. The rectifier controller 37 triggers rectifier 29 into the conductive state to conduct currents associated with two circuits; the first is the increasing current through inductor 25 supplied through transformer 9, the second is the half-cycle discharging current of capacitor 31 through inductor 33, and diode 39. This causes the voltage on capacitor 31 to reverse polarity and thereby forward bias controlled rectifier 41. This rectifier 41 is triggered to conduction by rectifier controller 37 at the time (determined by load voltage) rectifier 29 is to be turned off. This causes capacitor 31 to reverse bias controlled rectifier 29 by diverting the current from winding 11 of transformer 9, thereby returning controlled rectifier 29 to the non-conductive state. The voltage across controlled rectifier 29 rises as capacitor 31 is charged by the current from winding 11. When this voltage is twice the voltage of source 16, i.e., when the voltage across winding 13 equals the source voltage, diode 27 becomes conductive and the energy stored in the transformer is returned to the source. The controlled rectifier 29 may again be triggered to the conductive state at any time when the voltage across it is sufficiently positive to support conduction. Ideally, it should remain non-conductive for a period sufficiently long to permit the energy stored in the transformer core to be returned to the source 16 through diode 27.

I claim:
An electrical circuit comprising;
a transformer having primary and secondary windings;
a source of unidirectional signal;
a switch having high conductivity in response to a control signal applied thereto;
means including said switch connecting said primary winding to said source;
a pair of load terminals isolated from said primary winding;
an inductor and a rectifier;
means connecting said secondary winding of the transformer, said inductor and said rectifier in series circuit between said load terminals;
means connected to said switch for applying control signal thereto to alter the conductivity time of said switch in response to the signal appearing at said load terminals;
another winding on said transformer; and
a diode connecting said other winding to said source; the polarity of said other winding being opposite to the polarity of said primary winding and said diode being poled to oppose conduction of current from said source to said other winding.

References Cited by the Examiner
UNITED STATES PATENTS

| 2,791,739 | 5/1957 | Light | 321—2 |
| 2,920,259 | 1/1960 | Light | 321—44 X |
| 3,120,634 | 2/1964 | Genuit | 321—45 |

JOHN F. COUCH, Primary Examiner.
W. M. SHOOP, Assistant Examiner.